United States Patent [19]

Organek

[11] Patent Number: 5,505,285

[45] Date of Patent: Apr. 9, 1996

[54] CLUTCH BALL RAMP ACTUATOR DOUBLE LOCKING MECHANISM

[75] Inventor: Gregory J. Organek, Dearborn, Mich.

[73] Assignee: Eaton Corporation, Cleveland, Ohio

[21] Appl. No.: 516,261

[22] Filed: Aug. 17, 1995

Related U.S. Application Data

[63] Continuation of Ser. No. 199,404, Feb. 22, 1994, abandoned.

[51] Int. Cl.$^6$ .......................... F16D 43/00; F16D 13/04; F16D 13/42

[52] U.S. Cl. .................. 192/35; 192/40; 192/54.4; 192/54.52; 192/84 C; 192/93 A

[58] Field of Search .................. 192/35, 40, 48.2, 192/84 C, 84 AA, 93 A, 70.23, 54.4, 54.52

[56] References Cited

U.S. PATENT DOCUMENTS

| | | | |
|---|---|---|---|
| 1,974,390 | 9/1934 | Eason | 192/35 |
| 2,605,877 | 8/1952 | Winther | 192/84 AA |
| 2,801,719 | 8/1957 | Clerk | 192/35 |
| 2,937,729 | 5/1960 | Sperr | 192/35 X |
| 4,828,083 | 5/1989 | Naudin | 192/52 |

*Primary Examiner*—Rodney H. Bonck
*Attorney, Agent, or Firm*—Loren H. Uthoff, Jr.; Howard D. Gordon

[57] ABSTRACT

A ball ramp actuator for applying a driveline clutch clamping force to a clutch disc using an axial movement created when a control ring is rotated relative to an adjacent activation ring where rolling elements are disposed in opposed variable depth grooves formed in the control ring and likewise in the activation ring and where the rolling elements establish a variable axial separation distance, the ball ramp actuator also having a primary control clutch and a secondary control clutch where upon energizing an electromagnetic coil the primary control clutch energizes the ball ramp actuator and where the secondary control clutch frictionally couples a transmission input shaft to a pressure plate and also frictionally couples the control ring to the activation ring thereby establishing a relatively constant clutch clamping force.

5 Claims, 3 Drawing Sheets

FIG 2
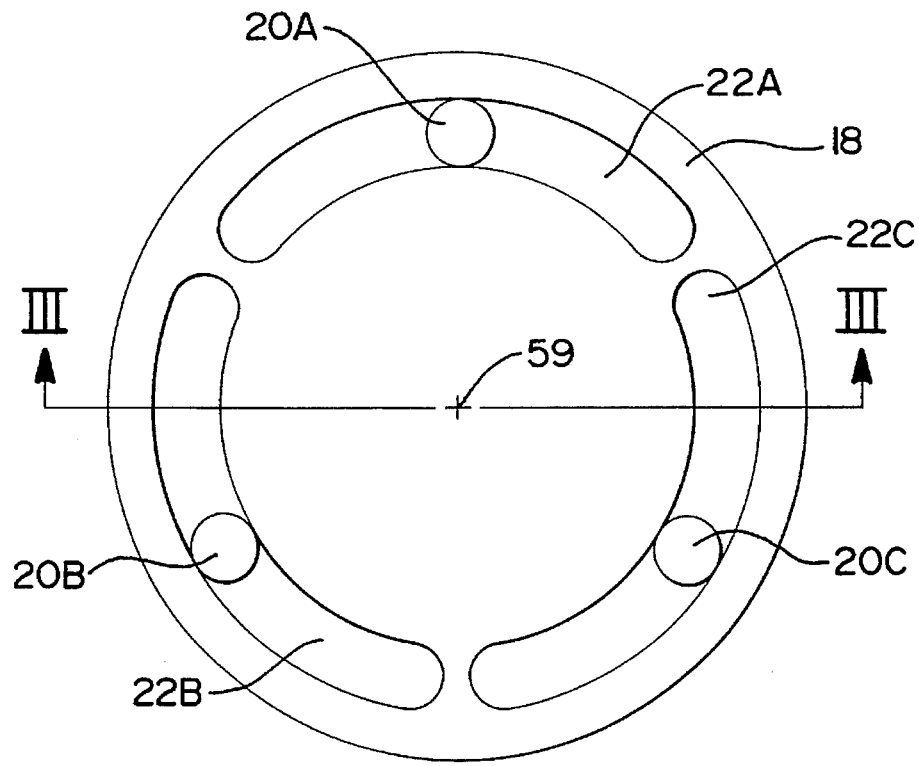
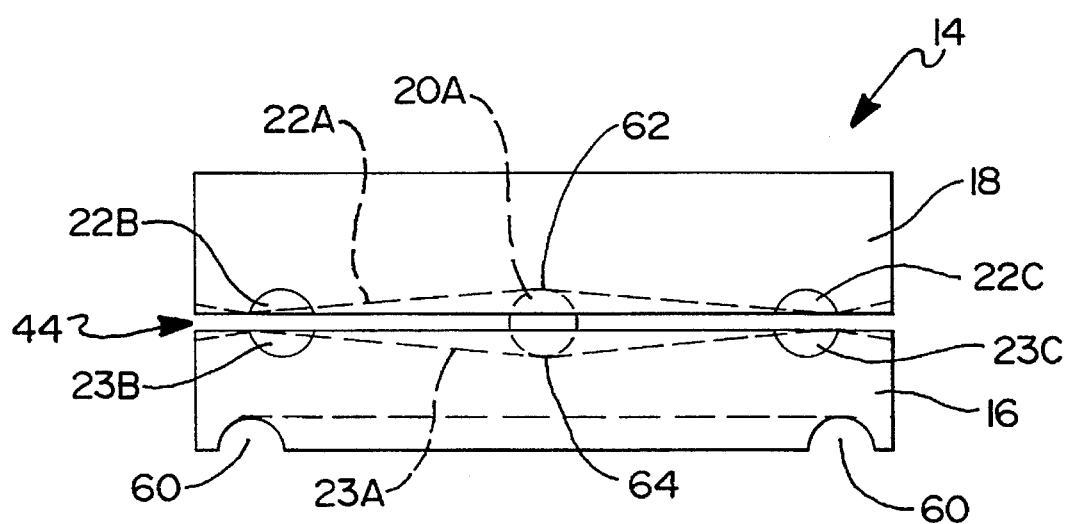
FIG 3

FIG 4
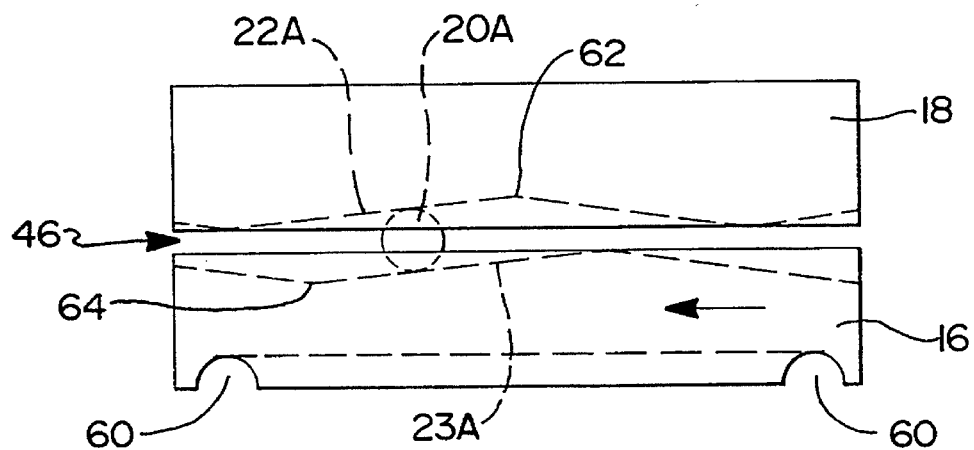
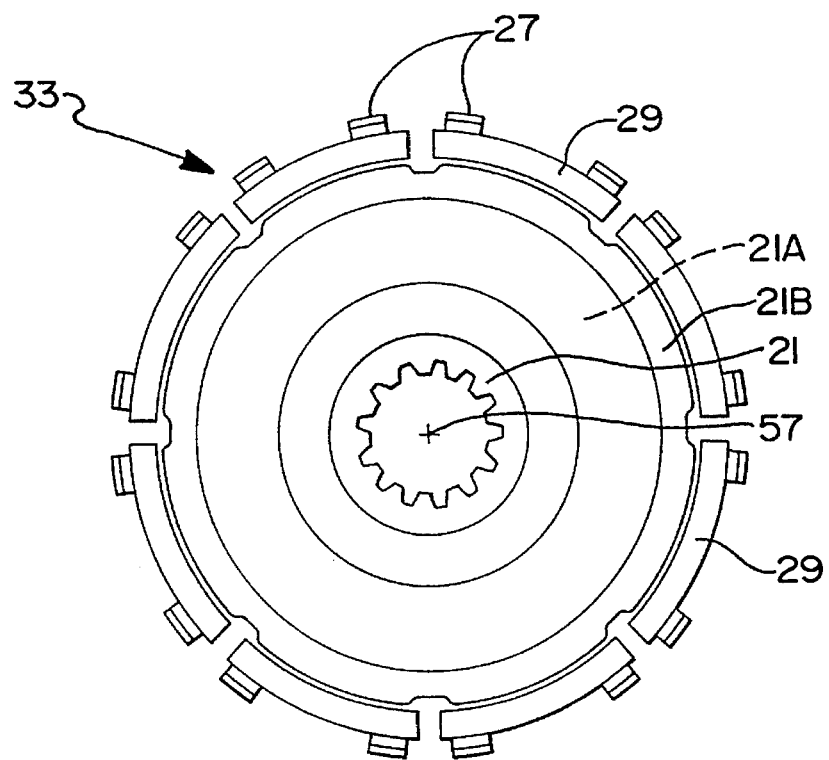
FIG 5

CLUTCH BALL RAMP ACTUATOR DOUBLE LOCKING MECHANISM

This is a continuation of application Ser. No. 08/199,404 filed on Feb. 22, 1994 and now abandoned.

RELATED APPLICATIONS

The present application relates to application USSN: 08/165,684 entitled "Ball Ramp Mechanism For A Driveline Clutch", filed on Dec. 13, 1993 and assigned to the same assignee, Eaton Corporation, as this application.

BACKGROUND OF THE INVENTION

The present invention relates to a ball ramp actuator utilized in a vehicle driveline clutch to supply a clamping force. More specifically, the present invention relates to a ball ramp actuator utilized in a vehicle driveline clutch to supply a clamping force where a secondary armature connected to the engine flywheel is used to lock the ball ramp actuator in position.

Ball ramp actuators have been used in various vehicle driveline components to produce an axial motion in response to a control signal which is used to load a clutch or other friction device. The control signal is used to supply an electrical current to an electrical device such as a coil or a motor which acts to energize the ball ramp actuator by applying a force to a control ring thereby resulting in relative rotational motion between the control ring and an activation ring. The relative motion causes one or more rolling elements to traverse a corresponding number of variable depth ramps formed in the control ring and the activation ring thereby causing the ball ramp mechanism to axially expand. Reference is made to U.S. Pat. Nos. 4,805,486, 5,078,249 and 5,092,825 the disclosures of which are hereby incorporated by reference, for a detailed teaching of the operation of prior art ball ramp mechanisms as used in vehicle driveline components.

One problem with ball ramp mechanisms is that undesirable changes in the degree of activation can occur due to variations in the input and output speeds and torques. This is especially true for ball ramp actuators that connect the control ring to a rotating input element and the activation ring to an output element and thereby use the input power to activate the ball ramp mechanism.

Application USSN: 08/165,684, the disclosure of which is incorporated by reference, discloses such a ball ramp mechanism used in a driveline clutch assembly to axially force the pressure plate against a clutch disc and flywheel.

SUMMARY OF THE INVENTION

The present invention utilizes a secondary control clutch to provide a locking force to a ball ramp actuator to maintain the relative position of the control ring and the activation ring and to also electromagnetically connect the pressure plate to the transmission input shaft. The fixing of the relative position of the control ring relative to the activation ring fixes the clamping load of the clutch disc at the maximum level achieved during an engagement event. It is desirable to firmly fix the clamping load on the clutch disc when the modulation of the engagement of the main driveline clutch has been completed and direct coupling of the engine flywheel to the transmission input shaft is desired.

The present invention permits the fixing of the ball ramp mechanism axial position upon full clutch engagement using the electromagnetic force supplied by the coil acting on a secondary control clutch such that the secondary control clutch, which is attached indirectly to the pressure plate, is frictionally coupled to the transmission input shaft thereby fixing the relative rotational position of the activation ring to the control ring so that the axial expansion of the ball ramp is also fixed.

The prior art devices provide for the internal locking of the ball ramp position through the increased excitation of the coil. However, due to the internal nature of the locking force, the existing ball ramp actuator will allow the torque capacity of the driveline clutch to vary depending on the speed and torque relationships between the transmission input shaft and the engine. By employing a secondary control clutch referenced to the engine speed through the flywheel, the highest torque capacity achieved during the activation of the ball ramp actuator can be locked to a fixed value. The present invention firmly establishes the frictional link between the flywheel and the transmission input shaft and serve to maintain the desired clutch lock-up condition under most all driveline conditions. Maximum current could be applied to the coil once the speed of the flywheel was equal to the speed of the transmission input shaft to apply an increased frictional force at the secondary control clutch.

One provision of the present invention is to provide a method to lock a ball ramp mechanism in position.

Another provision of the present invention is to lock a ball ramp mechanism in position using a coil.

Another provision of the present invention is to lock a ball ramp mechanism in position using a coil acting on a secondary control clutch.

Still another provision of the present invention is to lock a ball ramp mechanism in position using a coil acting on a secondary control clutch which is connected to an engine flywheel.

BRIEF DESCRIPTION OF THE DRAWINGS

FIG. 2 is an axial cross-sectional view of the ball ramp mechanism of the present invention;

FIG. 3 is an axial cross-sectional view of the ball ramp mechanism of the present invention taken on line III—III of FIG. 3;

FIG. 4 is an axial cross-sectional view of the ball ramp mechanism of the present invention taken on line III—III of FIG. 2 illustrating the axial movement of the ball ramp mechanism as the control ring is rotated; and FIG. 5 is an end elevational view of the secondary control clutch of the ball ramp actuator of the present invention taken on line V—V of FIG. 1.

DETAILED DESCRIPTION OF THE PREFERRED EMBODIMENT

Figure 1:
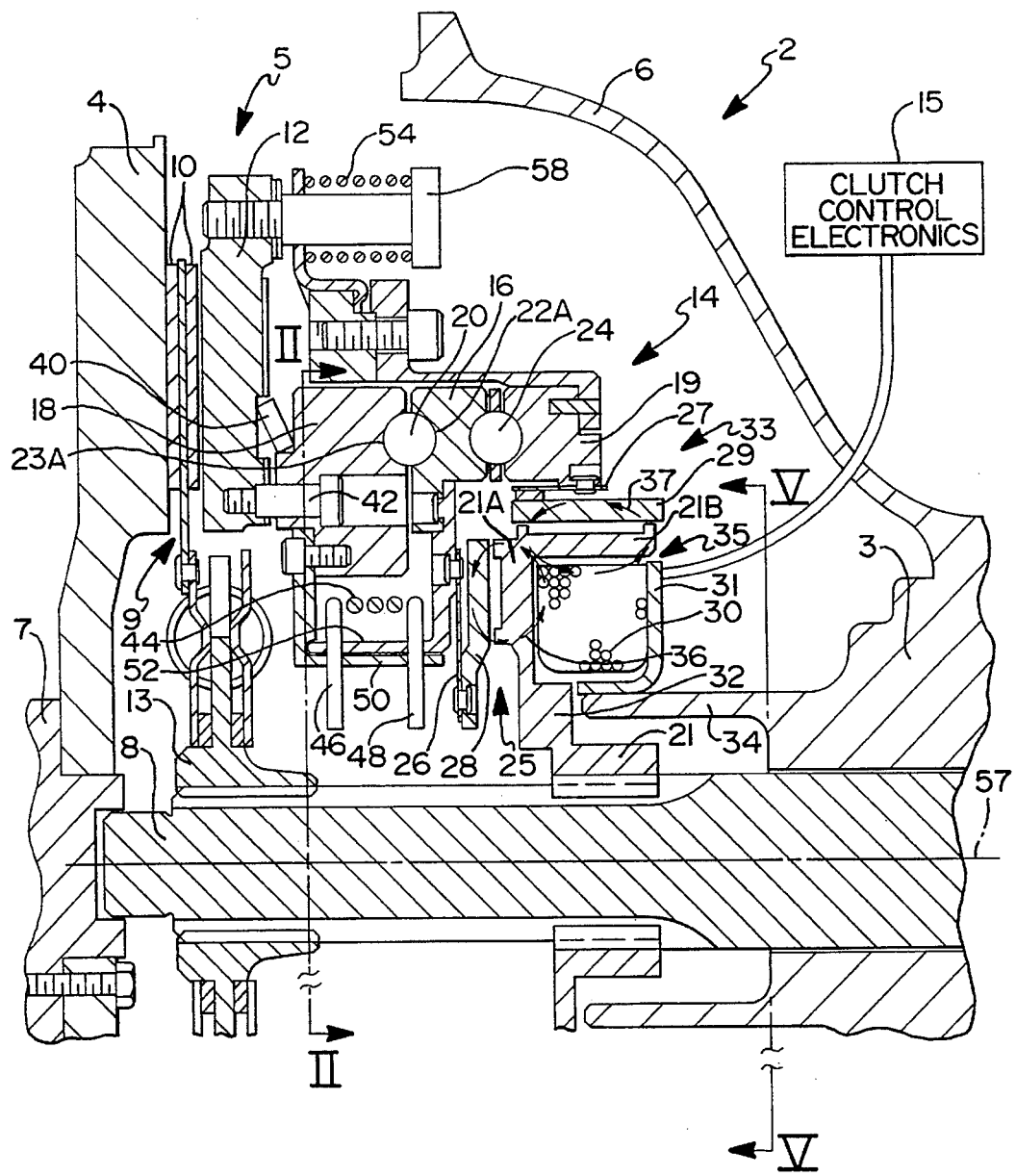
FIG. 1 is a partial cross-section of the ball ramp actuator of the present invention as utilized in a driveline clutch.

Referring now to the drawings, which are not intended to limit the present invention. FIG. 1 is an axial cross-sectional view of a main driveline clutch assembly 2 of the type in which the present invention may be utilized. The main driveline clutch assembly 2 includes a flywheel 4 rotatably driven by a prime mover (not shown) such as an internal combustion engine by its output crankshaft 7 which is coupled to a transmission 3 by a clutch assembly 5. A bellhousing 6 surrounds the flywheel 4 and supports the transmission 3 including the transmission input shaft 8 which extends to nonrotatably engage a clutch disc 9 through a spline 13 at the opposite end which drives the transmission gearing. A pressure plate 12 is used to clamp the clutch disc 9 through attached friction pads 10 to the flywheel 4 thereby transferring the rotational power from the prime mover to the transmission 3 through a transmission input shaft 8 and eventually to the rest of the vehicle driveline.

The pressure plate 12 is commonly forced toward the flywheel 4 using a plurality of activation springs. When the operator wishes to disengage the clutch disc 9, a mechanical release mechanism is activated by the operator's foot and leg overcoming the force of the springs thereby allowing the clutch disc 9 to slip relative to the flywheel 4. It should be understood, however, that neither the activation springs nor the mechanical release mechanism are features of the present invention which utilizes a ball ramp actuator 14 to force the pressure plate 12 toward the flywheel 4 which is controlled by clutch control electronics 15 rather than an operator during most transmission shifting sequences.

The clutch bellhousing 6 encloses the clutch assembly 5 including the ball ramp actuator 14 of the present invention. Ball ramp actuators that react a control ring to ground are well known in the art and have been used to load transmission gear clutches as disclosed in U.S. Pat. No. 5,078,249, and differential clutch packs as disclosed in U.S. Pat. No. 5,092,825 where the ball ramp control ring is reacted against case ground by a coil or motor. In essence, relative motion between a control ring 16 and an activation ring 18 causes one or more rolling elements 20, such as spherical elements, to be moved along a like number of opposed ramps 22 and 23 formed in both the control ring 16 and the activation ring 18 respectively. FIG. 2 illustrates this geometry with more detail and precision, reference to which is made subsequently.

A plurality of thrust elements 24 reacting against the thrust ring 19, which can be any type of suitable thrust bearing, are used to contain the axial forces generated by the ball ramp rolling elements 20 as they engage the ramps 22A and 23A in the activation ring 18 and the control ring 16. Rotation of the control ring 16 causes the activation ring 18 to move axially toward the flywheel 4 thereby clamping the clutch disc 9 between the pressure plate 12 and the flywheel 4. Attached to the control ring 16 is a flexible annular primary disc support 26 which supports a primary control clutch friction disc 28 made of a friction material. The primary control clutch friction disc 28 is drawn against the coil pole 32 when the coil 30 is energized by the clutch control electronics 15. An annular electrical coil 30 encircles the transmission input shaft 8 and is supported by the transmission case extension 34 and coil bracket 31 attached to the transmission 3. The electrical coil 30 is positioned in close proximity to the coil pole 32 separated by the air gap 35 from the coil 30 and is nonrotatably attached to the transmission input shaft 8 by spline 21. The electrical coil 30 is disposed to be partially enclosed by the coil pole 32 and is separated from it by a small air gap 35. The coil 30 is mounted to the transmission case extension 34 and therefore held stationary while the coil pole 32 rotates with the transmission input shaft 8. The coil 30 generates an electromagnetic flux 36 shown by arrows in FIG. 1 which travel through the coil pole 32 into the primary disc support 26 and back through the coil pole 32 into the coil 30. This electromagnetic flux 36 creates a force tending to draw the coil pole 32 into the primary disc support 26 thereby creating a frictional force and a resulting torque in the control ring 16 which activates the ball ramp actuator 14.

In addition, a secondary control clutch 33 comprised of a secondary control clutch friction disc 29 is attached to a thrust ring 19 by the secondary disc support 27. As the coil 30 is energized, the secondary control clutch friction disc 29 is magnetically attracted to the secondary pole 21B by the magnetic field 37 created by energizing coil 30. The geometry of the secondary control clutch friction disc 29 and the spring rate characteristics of the secondary disc support 27 are selected to yield the desired electromagnetic coupling between the secondary control clutch friction disc 29 and the secondary pole 21B which couples the control ring 16 to the activation ring 18 thereby maintaining the axial position of the pressure plate 12 in relation to the flywheel 12. In addition, an electromagnetic coupling is established between the pressure plate 12 and the flywheel 4 through the friction of the secondary control clutch friction disc 29 acting against the secondary pole 21B. In a preferred embodiment, the current level to the coil 30 is significantly increased as the ball ramp actuator locks the clutch assembly 2 so that the flywheel 4 is rotating at approximately the same speed as the transmission input shaft 8. In turn the secondary control clutch friction disc 29 contacts the secondary pole 21B to frictionally couple the control ring 16 to the activation ring 18 and the pressure plate 12. This action essentially locks the relative motion of the control ring 16 and the activation ring 18 unless slip occurs overcoming the frictional force generated between the secondary control clutch friction disc 29 and the secondary pole 21B.

The coil pole 21 which consists of the primary pole 21A and the secondary pole 21B, rotates with the transmission input shaft 8 while the coil 30 is stationary being supported on the transmission case extension 34. The primary control clutch friction disc 28 is indirectly tied to the flywheel 4 through primary disc support 26 and the ball ramp actuator 14 and has a limited rotational motion of 120° relative to the flywheel 4 for a ball ramp actuator using three rolling elements 20 and three associated ramps in the control ring 16 and the activation ring 18 as shown in the preferred embodiment. The pressure plate 12, the clutch disc 9 and the flywheel 4 rotate at the same speed as the transmission input shaft 8 when the clutch assembly 5 is locked up. To further fix the lock-up of the clutch assembly 5, a secondary control clutch friction disc 29 attached to the thrust ring 19 is electromagnetically connected to the transmission input shaft 8. This effectively ties the control ring 16 to the activation ring 18 and also ties the pressure plate 12 to the input shaft 8.

When the clutch disc 9 is unclamped or starts to slip due to excessive torque supplied by the prime mover (engine) through the flywheel 4, there is relative rotation between the control ring 16 and the activation ring 18 thereby forcing the rings 16 and 18 axially further apart (as described in further detail infra) thereby increasing the clamping force of the pressure plate 12 on the clutch disc 9 at the friction pads 10 and flywheel 4. This occurs through a small range of rotational motion of the control ring 16 relative to the activation ring 18 and provides an automatic, virtually instant, clamping force adjustment should any rotational slipping occur between the flywheel 4 and the transmission input shaft 8.

Once the primary control clutch friction disc 28 breaks loose from the lock-up condition against the primary pole 21A, the lower dynamic versus static coefficient of friction drops the force across the control clutch 25 into the ball ramp actuator 14 and the clamping force on the clutch disc 9 decreases. To regain the same or even higher clamping force to regain lock-up of the clutch disc 9, the electrical current to the coil 30 as controlled by the clutch control electronics 15 must be increased substantially. Once lock-up between the flywheel 4 and the transmission input shaft 8 is again achieved, the current to the coil 30 can be again reduced, taking advantage of the relatively large value of static friction in the control clutch 25 to hold the necessary clamping force on the clutch disc 9 and pressure plate 12.

According to the present invention, once the clutch assembly 5 is locked-up, the coil pole 21 rotates at the same speed as the flywheel 4 and minimal parasitic electrical power is required to be delivered to the coil 30 to maintain clutch assembly 5 lock-up. Using the teaching of the prior art, the control ring 16 is reacted against a ground surface, such as the bellhousing 6, and continuous slipping occurs between the control ring 16 through the primary control clutch friction disc 28 and the primary pole 21A resulting in high parasitic energy losses and no automatic ball ramp activation upon clutch slip. As disclosed in the present application, by attaching the control ring 16 to the transmission input shaft 8 through the magnetic coupling of both the primary and secondary control clutch friction discs 28 and 29 to the transmission input shaft 8, very little clutch slip occurs when the ball ramp actuator 14 is energized thereby minimizing energy losses. Also, the reaction time to even minimal slipping of the clutch disc 9 using the present invention is vertically instantaneous since slippage of the clutch disc 9 results in relative motion between the pressure plate 12, flywheel 4 and activation ring 18 assembly and the transmission input shaft 8, coil pole 21, primary and secondary control clutch friction discs 28 and 29 (which are attached to the control ring 16 and thrust ring 19 respectively), and control ring 16 assembly. The pressure plate 12 is coupled through a plurality of bolts 58 to the clutch pressure plate housing 56 which is in turn bolted to the flywheel 4 all rotating together.

Thus, according to the present invention, as the clutch disc 9 slips, there is relative motion between the flywheel 4, pressure plate 12, and ball ramp activation ring 18 as a first assembly and the control ring 16, primary control clutch 25, and transmission input shaft 8 as a second assembly and the pressure plate 12, secondary control clutch 33 and transmission input shaft 8 as a third assembly where slip between the first assembly and the second assembly causes the ball ramp actuator 14 to be energized so as to supply a higher clamping force on the clutch disc 9 and the third assembly utilizes the electromagnetic field created by the coil 30 to prevent further slippage automatically without command from the clutch control electronics 15.

A Belville spring 40 is interposed between the activation ring 18 and the pressure plate 12 where a smooth shank on pilot bolt 42 allows the pressure plate 12 to slide but not rotate relative to the activation ring 18. As an alternative to the Belville spring 40, any type of suitable spring could be utilized. The activation ring 18 then axially loads the pressure plate 12 through the Belville spring 40 so that its compliance functions to cushion any shock loads thereby preventing high loading of the ball ramp rolling elements 20.

The centering spring 44 functions to control the position of the control ring 16 relative to the activation ring 18 when the electrical coil 30 is not energized such that very little torque is applied through the ball ramp actuator 14, especially when the engine is rapidly accelerated and no clutch activation is desired. The centering spring 44 is shown as a torsional spring which is restrained in the clockwise direction by the clockwise retention pin 46 or similarly in the counterclockwise direction by the counterclockwise retention pin 48. The centering spring 44 is stressed by movement of the ball ramp tab 52, which is attached to the control ring 16 and the control clutch 25, as it moves relative to the activation tab 50 which is attached to the activation ring 18. When the ball ramp tab 52 moves in a clockwise direction, the clockwise retention pin 46 contacts the opposite side of the activation tab 50 causing the centering spring 44 to be stressed and to generate a centering force between the activation ring 18 and the control ring 16 that tends to return them to an orientation where no axial force is generated by the ball ramp actuator 14. Likewise, when the ball ramp tab 52 moves in a counterclockwise direction, the counterclockwise retention pin 48 contacts the opposite side of the activation tab 50 causing the centering spring 44 to be stressed and to generate a centering force between the activation ring 18 and the control ring 16 that tends to return them to an orientation where no axial force is generated by the ball ramp actuator 14.

A plurality of pressure plate springs 54 (one shown) act to pull the clutch pressure plate 12 away from the clutch friction disc 10 and the flywheel 4 by acting as expansion elements between the pressure plate housing 56 and a like number of retaining bolts 58 which are attached to the pressure plate 12 and slip through holes in the pressure plate housing 56. The pressure plate housing 56 is attached to the flywheel 4 such that the pressure plate 12 rotates with the flywheel 4 but can move axially relative to the flywheel 4 as controlled by action of the ball ramp actuator 14 acting to compress the pressure plate springs 54.

Referring now to FIGS. 2, 3 and 4 to describe the operation of the ball ramp actuator 14, a cross-sectional view of the ball ramp actuator 14 is shown in FIG. 2 and views taken along line III—III of the activation ring 18 and the control ring 16 separated by a spherical element 20A are shown in FIGS. 3 and 4. Three spherical rolling elements 20A, 20B and 20C are spaced approximately 120° apart rolling in three tapered ramps 22A, 22B and 22C respectively as the control ring 16 is rotated relative to the activation ring 18. Any number of spherical rolling elements 20 and respective ramps 22 could be utilized depending on the desired rotation and axial motion of the ball ramp actuator 14. It is desirable to employ at least three spherical rolling elements 20 travelling on a like number of identical equally spaced opposed ramps 22 formed in both the control ring 16 and the activation ring 18 to provide stability to the control ring 16, the activation ring 18 and the thrust ring 19. Any type of rolling element 20 could be utilized such as a ball or a roller. The activation ring 18 is shown which rotates with the pressure plate 12, the pressure plate housing 56 and the coil pole 21 turning about axis of rotation 59 coincident with the axis of rotation 57 of the transmission input shaft 8.

Three semi-circular, circumferential ramps 22A, 22B and 22C are shown formed in the face of the activation ring 18 with corresponding identical opposed ramps 23A, 23B and 23C (where 23B and 23C are not fully shown) formed in the face of the control ring 16 as shown in FIG. 3. The control ring 16 and the activation ring 18 are made of a high strength steel with the ramps 22A, 22B, 22C, 23A, 23B and 23C carburized and hardened to $R_c 55$–60. The ramps 22A, 22B, 22C, 23A, 23B and 23C are tapered in depth as more clearly shown in FIG. 3 and circumferentially extend for approximately 120° (actually less than 120° to allow for a separation section between the ramps). The axial separation 44 between the control ring 16 and the activation ring 18 is determined by the rotational orientation between the two corresponding opposed ramps such as 22A and 22B where the spherical rolling element 20A rolls on each ramp 22A and 22B as the control ring 16 is rotated relative to the activation ring 18 on the same axis of rotation. The relative rotation forces the two rings 16, 18 apart or allows them to come closer together as determined by the position of the rolling elements 20A,20B, and 20C or their respective ramp pairs 22A,23A, and 22B,23B, and 22C, 23C thereby providing an axial movement for clamping the clutch disc 9 between the pressure plate 12 and the flywheel 4.

FIG. 3 illustrates the rotational orientation of the control ring 16 and the activation ring 18 when the axial separation distance 44 is at a minimum when the ramps 22A and 23A are aligned and the spherical element 20A is in the deepest section of the ramps 22A and 23A. As the control ring 16 is rotated relative to the activation ring 18 by application of a control torque input from the control clutch 25, the ramps 22A and 23A move relative to one another causing the spherical element 20A to roll on each of the ramp surfaces 22A and 23A moving to a different position on both ramps 22A and 23A thereby forcing the control ring 16 and the activation ring 18 apart to a wider separation distance 46. A similar separation force is generated by rolling element 20B rolling on ramp surfaces 22B and 23B and by rolling element 20C rolling on ramp surfaces 22C and 23C. The rotation of the control ring 16 is clearly illustrated in FIGS. 3 and 4 by the relative shift in position of reference points 62 and 64 from directly opposed in FIG. 3 to an offset position in FIG. 4 caused by rotation of the control ring 16 in the direction of the arrow. This axial displacement can be used for a variety of applications since the force level relative to the torque applied to the control ring 16 is quite high, typically a ratio of 100:1. This can be used as illustrated in this application to load a pressure plate 12 against a clutch disc 9 and flywheel 4 in a vehicle driveline. Additional illustrative details of operation of a ball ramp actuator can be found by reference to U.S. Pat. No. 4,805,486.

FIG. 5 is a cross-sectional view of FIG. 1 taken on line V—V showing the secondary control clutch 33 of the present invention. The circular shaped secondary control clutch 33 rotates about an axis of rotation 57 and is nonrotatably connected to the transmission input shaft 8 by a plurality of splines 21 which engage mating splines on the transmission input shaft 8.

The primary pole 21A and the secondary pole 21B are electromagnetically energized by the coil 30 which attracts and flows through the plurality of secondary control clutch friction discs 29 which are attached to the thrust ring 19 (not shown) through a plurality of secondary disc supports 27. The secondary disc supports 27 are flexible so as to allow the secondary control clutch friction discs 29 to radially move and frictionally contact the secondary pole 21B when the coil 30 is energized to a defined level. The spring rate of the secondary disc supports 27 and the operating air gap between the secondary control clutch friction discs 29 and the secondary pole 21B when the coil 30 is not energized can be selected to produce frictional contact of the secondary control clutch 33 at the desired point of operation with respect to the frictional contact of the primary control clutch 25. For example, the primary control clutch 25 can be energized and used to lock-up the driveline clutch assembly 2, then the current supplied to the coil 30 by the clutch control electronic 15 can be significantly increased thereby causing the secondary control clutch 33 to frictionally engage to further lock-up the ball ramp actuator 14.

Referring again to FIG. 1, in operation, the control ring 16 is frictionally coupled to the transmission input shaft 8 through the control clutch 25 which is magnetically energized and controlled by coil 30 where electrical power is supplied by the clutch control electronics 15. The activation ring 18 rotates with the pressure plate 12 and the pressure plate housing 56 which is attached to and rotates with the flywheel 4. The control ring 16 is rotationally coupled to the transmission input shaft 8 by the control clutch 25 whose operation is controlled by the magnetic field 36 created by electrical energization of the coil 30.

If the flywheel 4 is rotating at the same speed as the transmission input shaft 8, even if the coil 30 is energized, the control ring 16 rotates at the same speed as the activation ring 18 and no additional axial force is generated by the ball ramp actuator 14 since there is no relative rotation between the control ring 16 and the activation ring 18. Assuming the coil 30 remains energized thereby tying the control ring 16 to the transmission input shaft 8 through the primary control clutch 25, if there is relative rotation between the flywheel 4 and the transmission input shaft 8, this results in relative motion between the control ring 16 and the activation ring 18 which causes the spherical elements 20A, 20B and 20C to further separate the control ring 16 and the activation ring 18 thereby generating additional clamping force to the pressure plate 12 so as to use the power of the flywheel to increase the lock-up force on the pressure plate 12.

An additional force tying the transmission input shaft 8 to the pressure plate 12 is generated by the secondary control clutch 33. The secondary control clutch 33 also ties the control ring 16 to the activation ring 18 for instant activation and additional clamping of the friction disc 9 should any slippage occur.

Axial forces generated by the ball ramp actuator 14 are transmitted by the thrust elements 24 rolling in thrust channel 60 into the thrust ring 19 which is also grooved to accept the thrust elements 24. The thrust ring 19 is attached to the pressure plate housing 56 which is bolted to the flywheel 4. In the opposite direction, the force generated by the ball ramp actuator 14 is transmitted to the Belville spring 40 into the pressure plate 12.

This invention has been described in great detail, sufficient to enable one skilled in the art to make and use the same. Various alterations and modifications of the invention will occur to those skilled in the art upon a reading and understanding of the foregoing specification, and it is intended to include all such alterations and modifications as part of the invention, insofar as they come within the scope of the appended claims.

We claim:

1. A driveline clutch assembly for coupling a flywheel to a transmission input shaft comprising:

a flywheel rotated about an axis of rotation by a prime mover;

a driveline transmission having an input shaft and a housing;

a clutch disc nonrotatably attached to said input shaft, said clutch disc radially extending from said input shaft and having friction material on a first surface and a second surface where said first surface frictionally engage said flywheel;

a pressure plate rotating about said axis of rotation having a first surface for frictionally engaging said second surface of said clutch disc;

a ball ramp mechanism for moving said pressure plate toward said clutch disc and said flywheel thereby causing said clutch disc to be clamped therebetween comprising; an activation ring encircling said input shaft, said activation ring being axially slidingly connected to said pressure plate where axial movement of said activation ring results in axial movement of said pressure plate acting through a spring, a control ring encircling said input shaft and disposed adjacent to said activation ring, said control ring and said activation ring having opposed faces provided with circumferentially extending grooves, arranged in at least three opposed pairs of grooves, said grooves having portions of varying depth, and rolling members disposed one in each opposed pair of grooves, the grooves on said activation ring and said adjacent control ring being arranged so that relative angular movement of axial activation ring and control ring in either direction, from a starting position thereof, causes axial movement of said activation ring away from said control ring and operating through said spring to axially displace said adjacent pressure plate;

bearing means operative to absorb axial thrust loads from said control ring, said bearing means reacting against said flywheel through a support member;

a coil for inducing a magnetic field attached to said housing and encircling said input shaft;

a primary control clutch having a primary friction element attached to said control ring where upon electromagnetic application by said coil, said primary control clutch frictionally couples said control ring to said input shaft;

a secondary control clutch having a secondary friction element rotating with said pressure plate where upon electromagnetic application by said coil, said secondary control clutch frictionally couples said pressure plate to said input shaft.

2. A ball ramp mechanism for coupling two rotating elements comprising:

an input element driven by a prime mover and rotating about an axis of rotation;

an output element having an axis of rotation coaxial with said axis of rotation of said input element for rotating an output device;

a ball ramp actuator for generating an axial movement comprising; an annular control ring having an axis of rotation said control ring having at least two circumferential control ramps formed in a first face of said control ring, said control ramps varying in axial depth, an equivalent number of rolling elements one occupying each of said ramps, an activation ring having an axis of rotation along said axis of rotation of said control ring, said activation ring having at least two activation ramps substantially identical in number, shape and radial position to said control ramps in said control ring where said activation ramps at least partially oppose said control ramps and where each of said rolling elements is trapped between said activation ramp and a respective at least partially opposed control ramp, said control ring axially and rotationally movably disposed relative to said activation ring;

coupling means for rotatably joining said input element to said output element where said coupling means varies the degree of rotational coupling between said input element and said output element according to the axial position of said control ring relative to said activation ring;

a coil for inducing an electromagnetic field encircling said output element;

a primary control clutch having a primary friction element attached to said control ring where upon electromagnetic application by said coil, said primary control clutch frictionally couples said control ring to said output element;

a secondary control clutch having a secondary friction element rotating with said input element where upon electromagnetic application by said coil, said secondary control clutch frictionally couples said input element to said output element.

3. A method of coupling two rotating elements using a ball ramp actuator comprising:

providing an input element rotating about an axis of rotation;

providing an output element rotating about an axis of rotation;

providing a flywheel having a friction surface joined to said input element and rotating therewith;

providing a pressure plate having a friction surface opposing said friction surface of said flywheel and nonrotatably joined to said flywheel, said pressure plate being axially displaceable relative to said flywheel;

providing a clutch disc having circumferential friction pads interposed between said flywheel friction surface and said pressure plate friction surface, said clutch disc being nonrotatably joined to said output element and having an axis of rotation congruent with said axis of rotation of said output element;

providing a ball ramp actuator for axially moving said pressure plate clamping said clutch disc between said pressure plate and said flywheel thereby frictionally transferring the rotational motion of said flywheel to said output element, said ball ramp actuator comprising; a control ring having a plurality of circumferential axial grooves formed therein where said grooves have a tapered axial depth; an activation ring having a like number of substantially identically formed opposed grooves therein when said control ring and said activation ring are separated by a like number of rolling elements, one occupying each pair of opposed grooves in said control ring and said activation ring, said activation ring nonrotatably connected to said pressure plate;

providing a coil for inducing an electromagnetic field encircling said output element;

providing a primary control clutch having a primary first section connected to said control ring and a primary second section disposed between and immediately adjacent to said primary first section and said coil, said primary second section nonrotatably attached to said output element:

providing a secondary control clutch having a secondary first section rotating with said pressure plate and a secondary second section connected to said primary second section, said secondary second section disposed between and immediately adjacent to said secondary first section and said coil;

connecting said control ring to said output element through said primary control clutch where said coil is energized to electromagnetically join said primary first section to said primary second section thereby frictionally joining said control ring to said output element where relative rotational motion between said pressure plate and said transmission shaft causes relative rotational motion between said activation ring and said control ring thereby axially moving said pressure plate toward said flywheel;

connecting said pressure plate to said output element through said secondary control clutch when said coil is energized to electromagnetically join said secondary first section to said secondary second section thereby joining said pressure plate to said output shaft.

4. A driveline clutch assembly for coupling a flywheel to a transmission input shaft comprising:

a flywheel rotated about an axis of rotation by a prime mover;

a driveline transmission having a transmission input shaft and a transmission housing;

a clutch disc nonrotatably attached to said transmission input shaft, said clutch disc radially extending from said transmission input shaft and having friction material on a first surface and a second surface where said first surface frictionally engage said flywheel;

a pressure plate encircling said transmission input shaft having a first surface for frictionally engaging said second surface of said clutch disc;

a pressure plate housing attached to said flywheel;

a ball ramp mechanism for moving said pressure plate toward said clutch disc and said flywheel causing said clutch disc to be clamped therebetween comprising; an activation ring encircling said transmission input shaft, said activation ring being connected to said pressure plate where axial movement of said activation ring results in axial movement of said pressure plate, a control ring encircling said transmission input shaft and disposed adjacent to said activation ring, said control ring and said activation ring having opposed faces provided with circumferentially extending grooves, arranged in at least three opposed pairs of grooves including portions of varying depth, and rolling members disposed one in each of said opposed pair of grooves, where said grooves on said activation ring and said adjacent control ring are arranged so that relative rotational movement of said activation ring and said control ring in either a clockwise or counterclockwise direction, from a starting position thereof, causes axial movement of said activation ring away from said control ring to axially displace said pressure plate toward said flywheel thereby clamping said clutch disc therebetween;

bearing means operative to absorb axial thrust loads from said control ring, said bearing means reacting against said flywheel through said pressure plate housing;

a coil for inducing a magnetic field attached to said transmission housing and encircling said transmission input shaft;

a primary control clutch having a primary friction element attached to said control ring where upon electromagnetic application by said coil, said primary control clutch frictionally couples said control ring to said transmission input shaft;

a secondary control clutch having a secondary friction element rotating with said pressure plate where upon electromagnetic application by said coil, said secondary control clutch frictionally couples said pressure plate to said transmission input shaft.

5. The driveline clutch assembly of claim 4, wherein said grooves have a maximum depth at approximately a centerline of said grooves and a minimum depth at approximately each end of said grooves.

* * * * *